(12) United States Patent
Ito

(10) Patent No.: US 6,741,987 B2
(45) Date of Patent: May 25, 2004

(54) PREFERENCE LEARNING APPARATUS, PREFERENCE LEARNING SYSTEM, PREFERENCE LEARNING METHOD, AND RECORDING MEDIUM

(75) Inventor: Noriko Ito, Tokyo (JP)

(73) Assignee: NEC Corporation, Tokyo (JP)

( * ) Notice: Subject to any disclaimer, the term of this patent is extended or adjusted under 35 U.S.C. 154(b) by 308 days.

(21) Appl. No.: 09/962,102

(22) Filed: Sep. 26, 2001

(65) Prior Publication Data

US 2002/0038342 A1 Mar. 28, 2002

(30) Foreign Application Priority Data

Sep. 27, 2000  (JP) ........................................ 2000-293489

(51) Int. Cl.[7] .............................................. G06F 17/30
(52) U.S. Cl. ............................................................ 707/6
(58) Field of Search .............................................. 707/6

(56) References Cited

U.S. PATENT DOCUMENTS 6,286,005 B1 * 9/2001 Cannon ...................... 707/100
6,381,465 B1 * 4/2002 Chern et al. ................ 455/466
6,510,417 B1 * 1/2003 Woods et al. ............... 704/275
2001/0014868 A1 * 8/2001 Herz et al. .................... 705/14
2002/0037083 A1 * 3/2002 Weare et al. ................. 381/58

FOREIGN PATENT DOCUMENTS

JP    11-15840    1/1999

* cited by examiner

Primary Examiner—Wayne Amsbury
(74) Attorney, Agent, or Firm—Foley & Lardner (57) ABSTRACT

A preference learning apparatus includes a content attribute information database, action information database, time information correlation table, area information correlation table, user's preference information database, user action detection section, and preference information management section. The preference information management section generates preference analysis data using time zone information, area name, attribute and its weight, and attribute value related to a user's preference and updates the weight contained in preference information in the user's preference information database, which is specified by time zone information, area name, attribute/attribute value, and user ID, with the weight contained in the generated preference analysis data. A preference learning system, preference learning method, and recording medium are also disclosed.

12 Claims, 9 Drawing Sheets

FIG. 1

| 200 | 201 | 202 | 203 | 204 | 205 |
|---|---|---|---|---|---|
| USER ID | ATTRIBUTE/ ATTRIBUTE VALUE | TIME ZONE | AREA | WEIGHT | RECORDING DATE/TIME |
| ⋮ | ⋮ | ⋮ | ⋮ | ⋮ | ⋮ |

FIG. 2

| 300 | 301 | 302 |
|---|---|---|
| BEHAVIOR NAME | ATTRIBUTE | WEIGHT |
| ⋮ | ⋮ | ⋮ |

FIG. 3

| 400 | 401 | 402 |
|---|---|---|
| CONTENT ID | ATTRIBUTE | ATTRIBUTE VALUE |
| | ⋮ | ⋮ |

| USER ID | MEASUREMENT TIME | USER POSITION | BEHAVIOR NAME | CONTENT ID |
|---|---|---|---|---|
| 600 | 601 | 602 | 603 | 604 |

FIG. 6

| TIME ZONE | TIME RANGE |
|---|---|
| MORNING | 06:00~11:00 |
| NOON | 11:00~14:00 |
| EVENING | 14:00~17:00 |
| NIGHT | 17:00~06:00 |

FIG. 7

| AREA NAME | CENTRAL POINT | RADIUS |
|---|---|---|
| ⋮ | ⋮ | ⋮ |

| 900 | 901 | 902 | 903 | 904 | 905 |
|---|---|---|---|---|---|
| ID= ABC0123 | KEYWORD: FAST-FOOD | 11:00 ~ 14:00 | (E139.42.14.151,N35.39.24.23.6) 10-km RADIUS CIRCLE CENTERED ON "HAMBURGER SHOP B" | 8.2 | July 30, 2000 |
| | KEYWORD: ITALIAN MEAL | 17:00 ~ 06:00 | (E139.42.56.2,N35.39.42.6) 10-km RADIUS CIRCLE CENTERED ON "STATION C" | 7.0 | Aug. 4, 2000 |
| | KEYWORD: CHINESE MEAL | 11:00 ~ 14:00 | (E139.6.24.0,N35.13.48.5) 10-km RADIUS CIRCLE CENTERED ON "STATION D" | 5.5 | July 29, 2000 |

PREFERENCE LEARNING APPARATUS, PREFERENCE LEARNING SYSTEM, PREFERENCE LEARNING METHOD, AND RECORDING MEDIUM

BACKGROUND OF THE INVENTION

The present invention relates of a preference learning apparatus, preference learning system, preference learning method, and recording medium for collecting and learning preference information considering time and place from a portable information terminal that a user is carrying.

Conventionally, examinations have been done about an information filtering technique for selecting information corresponding to the user's preference from an enormous quantity of digitized information (contents) published on the Internet or an information navigation technique using the information filtering. In the information filtering technique, to quantify the degree of user's interest and process it by a computer, a vector expressing what kind of content is a user's interest is often used.

In such a technique, the user's preference must be properly learned. To learn a user's preference, a user's preference is estimated from the user's log of access to contents. One of such methods is disclosed in Japanese Patent Laid-Open No. 11-15840 in which information following the preference of a user, that changes along with the elapse of time, is automatically selected without requiring any explicit setting and evaluation from the user himself/herself. Another method has also been proposed in which the movement pattern of a user who uses a portable information terminal is monitored, and the user's preference information is automatically learned on the basis of information related to a place where the user stayed.

In these conventional preference learning methods, however, user's preference information is learned without taking any time zone and place into consideration. For this reason, under circumstances unique to a mobile environment where the preference changes in accordance with the user's situation, a content that is optimum for the time zone and place where the user is present cannot be provided in response to a browsing request from the user. In the mobile environment, when a user searches for POI (Point Of Interest) information such as restaurant information or sightseeing spot information using a portable information terminal or a car navigation system with an information search function, the user's preference information changes depending on the time zone and place.

For example, a user who often uses a fast-food restaurant at lunch time may not go to a fast-food restaurant but to an exclusive restaurant at suppertime. A user who often goes to an Italian restaurant in Tokyo may rather be fond of a local meal at a tour.

SUMMARY OF THE INVENTION

It is an object of the present invention to provide a preference learning apparatus, preference learning system, preference learning method, and recording medium which can learn preference information of a user who uses a portable information terminal in accordance with the time zone and place in which the user behaves.

It is another object of the present invention to provide a preference learning apparatus, preference learning system, preference learning method, and recording medium which can extract and manage user's preference information that changes.

In order to achieve the above objects, according to the present invention, there is provided a preference learning apparatus for detecting a user's action from a portable information terminal to which various kinds of contents are provided through a communication channel and learning a user's preference on the basis of a detected action log, comprising a content attribute information database for storing, for each content, an attribute as an object of the learning contained in each of various kinds of contents, and an attribute value, a action information database for storing, for each action, an attribute as an object of the learning estimated from the user's action and a weight for the attribute, a time information correlation table for storing a name and time range of a time zone in correspondence with each other, an area information correlation table for storing each area name and area range in correspondence with each other for each of a plurality of areas which classify position information of the user, a user's preference information database for storing, for each user's preference information containing an attribute/attribute value as objects of the learning, a weight for the attribute, a time zone when the weight is valid, and a place where the weight is valid, user action detection means for detecting the user's action on the basis of information obtained from the portable information terminal and acquiring detection data containing a user ID indicating the user, a action name indicating the action, a content ID indicating a content related to an object of the action, and a measurement time and position information at which the action has been detected, and preference information management means for updating the user's preference information database on the basis of preference analysis data obtained by analyzing the user's preference on the basis of the detection data output from the user action detection means, wherein the preference information management means generates the preference analysis data using time zone information acquired from the time information correlation table on the basis of the measurement time contained in the detection data output from the user action detection means, the area name acquired from the area information correlation table on the basis of the position information contained in the detection data, the attribute and weight contained in the action which are acquired from the action information database on the basis of the action name contained in the detection data, and the attribute value acquired from the content attribute information database on the basis of the attribute related to the preference and the content ID contained in the detection data, and updates, with the weight contained in the generated preference analysis data, the weight contained in the preference information in the user's preference information database, which is specified by the time zone information, area name, and attribute/attribute value as objects of the learning, which are contained in the generated preference analysis data, and the user ID contained in the detection data.

DESCRIPTION OF THE PREFERRED EMBODIMENTS

The present invention will be described next in detail with reference to the accompanying drawings.

Figure 1:
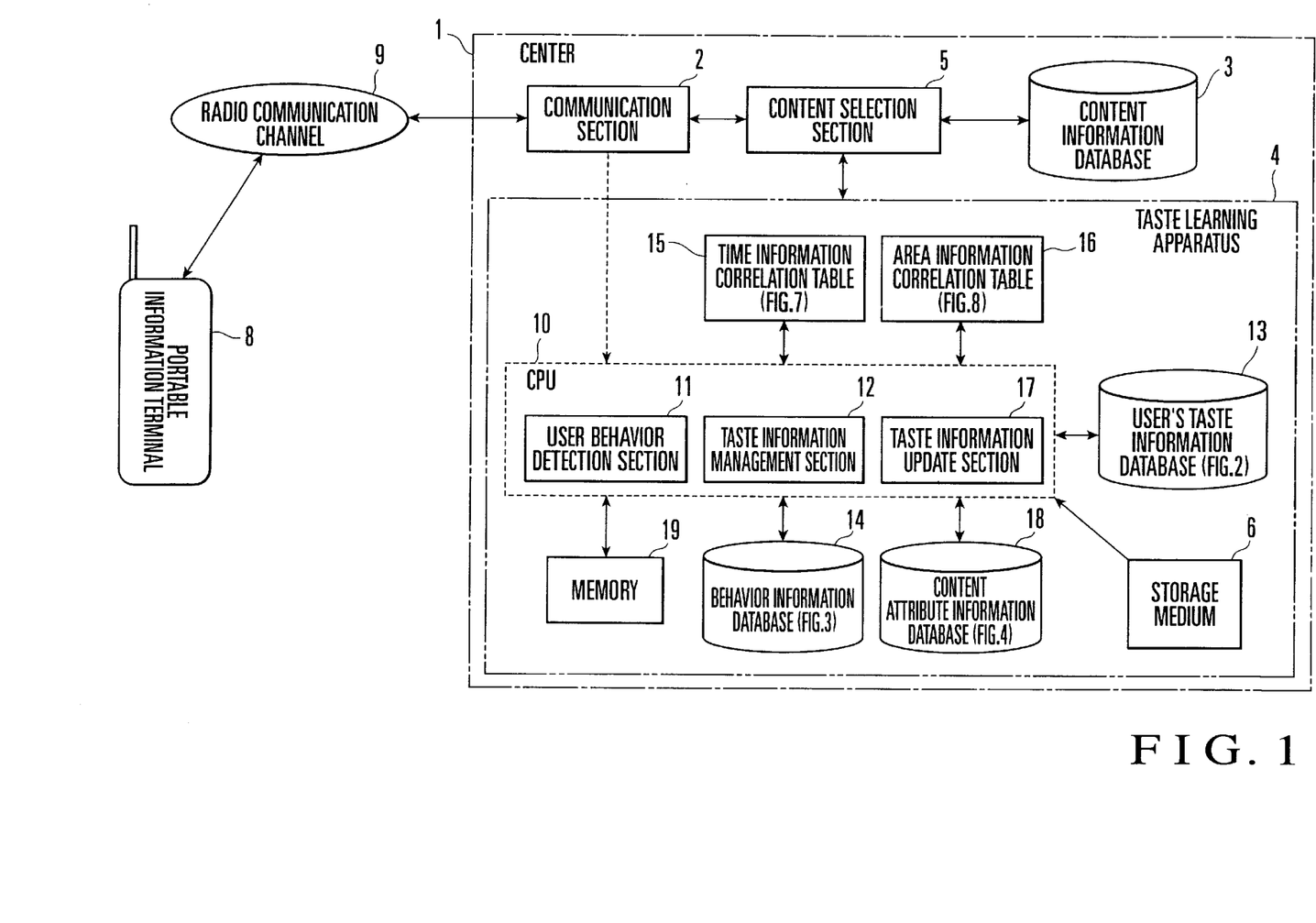
FIG. 1 is a block diagram of a preference learning system according to an embodiment of the present invention.

FIG. 1 shows a preference learning system according to an embodiment of the present invention. The preference learning system of this embodiment is constructed by a center 1 for managing various kinds of digitized information (contents) to be provided to users, and a portable information terminal 8 connected to the center 1 through a radio communication channel 9 to access the center 1 and acquire and display a desired content in accordance with user's operation.

The center 1 has a communication section 2 for communicating with the user's portable information terminal 8 through the radio communication channel 9, a content information database 3 for storing contents to be distributed to the user's portable information terminal 8, a preference learning apparatus 4 for learning the user's preference on the basis of information obtained from the portable information terminal 8 in accordance with the time zone and position of user's action, and a content selection section 5 for selecting a content to be distributed to the user's portable information terminal 8 on the basis of the learning contents of the preference learning apparatus 4.

The preference learning apparatus 4 comprises a storage medium 6, a user's preference information database 13, a action information database 14, a time information correlation table 15, an area information correlation table 16, a content attribute information database 18, a CPU (Central Processing Unit) 10 for controlling these sections, and a memory 19. The CPU 10 which operates by loading a stored program while accesses the storage medium 6 or memory 19 implements a user action detection section 11, preference information management section 12, and preference information update section 17.

The user action detection section 11 detects user's action, contents related to the object of action, and time and position information of the action. The preference information management section 12 extracts user's preference information from various kinds of information detected by the user action detection section 11 and learns the preference information. The preference information update section 17 updates a weight contained in each preference information in the user's preference information database 13 every predetermined time.

The user's preference information database 13 stores user's preference information according to time zones and user's positions. The action information database 14 stores data representing user's actions attributes related to user's preference estimated from the actions, and weights (added/subtracted values) for the attributes. The time information correlation table 15 stores data representing time zones corresponding to times when actions are detected. The area information correlation table 16 stores data for classifying user's positions into areas. The content attribute information database 18 stores data representing attributes related to user's preferences contained in various kinds of contents and their attribute values.

In the preference learning system having the above arrangement, on the basis of preference information learned by the preference learning apparatus 4 in the center 1, a content corresponding to the user's situation (time, place, and preference) is selected from the content information database 3 by the content selection section 5 and provided to the portable information terminal 8 through the communication section 2 and radio communication channel 9. The user's preference is learned by the preference learning apparatus 4 on the basis of the user's action log (the user's movement pattern, operation for provided information at the portable information terminal, and the like).

The position of the preference learning apparatus 4 is not particularly limited. The preference learning apparatus 4 may be arranged in either of the center and the user's portable information terminal, which communicate with each other through the radio communication channel, as will be described later.

Figure 2:
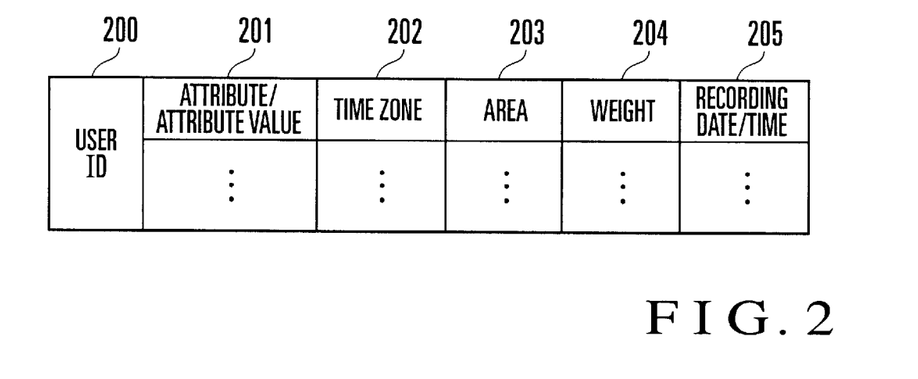
FIG. 2 is a view showing a user's preference information database shown in FIG. 1.

The user's preference information database 13 is a set of preference information managed for each user, as shown in FIG. 2. A user ID 200 is identification information used to identify each user. An attribute/attribute value 201 represents an attribute related to a user's preference and its attribute value, which can be regarded as an index for expressing one of user's preferences and its value. For example, as an attribute, "keyword", "opening hours", or the like is used. As the attribute value, a value corresponding to the attribute is used.

A time zone 202 represents a time zone in which the attribute/attribute value 201 is valid as a preference. An area 203 represents an area where the attribute/attribute value 201 is valid. A weight 204 is weight information representing the preference strength for the attribute/attribute value 201. A recording date/time 205 represents the latest date/time when the value of the weight 204 for the time zone 202 was recorded or updated.

Figure 3:
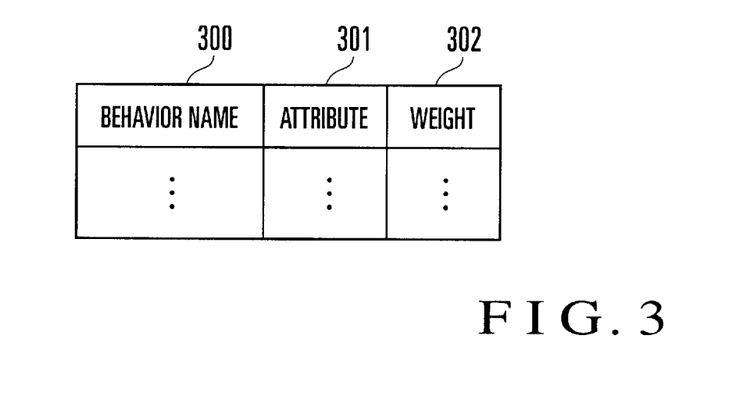
FIG. 3 is a view showing a action information database shown in FIG. 1.

The action information database 14 is a set of action information, as shown in FIG. 3. A action name 300 indicates the name of a action (e.g., "visit", "browse", or "purchase") executed by a user. An attribute 301 indicates an attribute (e.g., keyword or category) estimated from the action represented by the action name 300. A weight 302 is the value of a weight added or subtracted every time the action represented by the action name 300 is executed. If a action has a negative meaning, its weight has a negative value. For example, when a user never wants to see a certain content again (e.g., presses a button), it is a negative action. At this time, the action name is "visit", the attribute is "keyword", and the weight is "−1".

Figure 4:
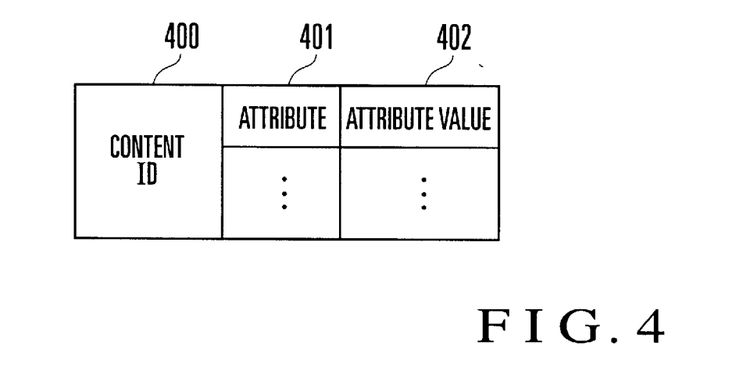
FIG. 4 is a view showing a content attribute database shown in FIG. 1.

The content attribute information database 18 is a set of content attribute information, as shown in FIG. 4. A content ID 400 is identification information used to identify a content related to the object of a user's action. An attribute 401 represents an attribute related to a user's preference contained in the content, such as "keyword" or "opening hours". An attribute value 402 is a value corresponding to the attribute 401. For example, when the attribute 401 is "keyword", the attribute value 402 is "fast-food". If the attribute 401 is "opening hours", the attribute value 402 is "10:00 to 22:30".

The operation of the above-described preference learning system will be described next.

A case wherein the center 1 which manages various kinds of information provides a content according to a user's situation (time, place, and preference) to the user's portable information terminal 8 through the radio communication channel 9 will be described. In selecting a content according to a user's situation, the content selection section 5 in the center 1 executes information filtering using the user's preference information stored in the user's preference information database 13 of the preference learning apparatus 4. The center 1 monitors the user's action, learns the user's preference information that possibly changes, and records/updates information in the user's preference information database 13.

Figure 5:
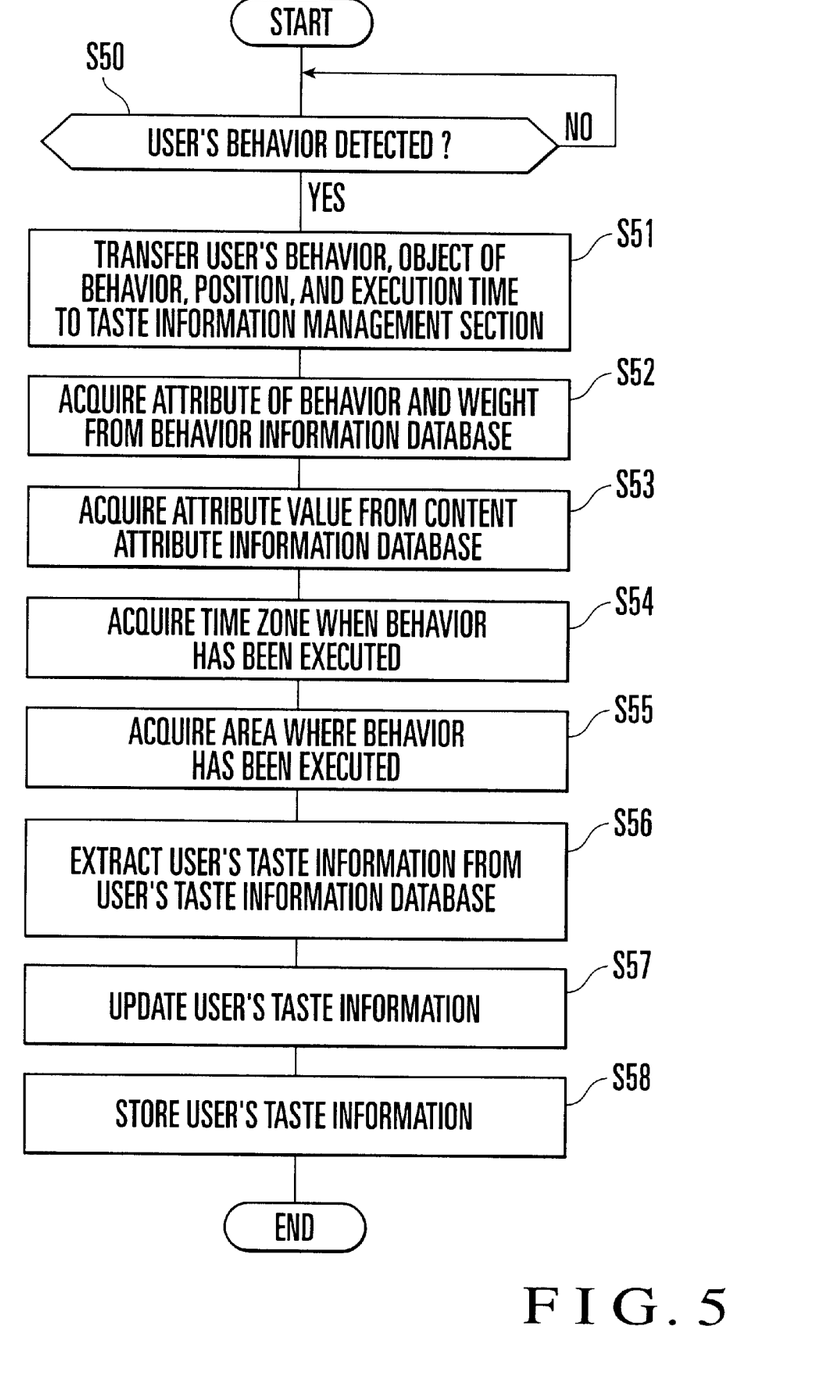
FIG. 5 is a flow chart showing processing by a preference information management section.
Figure 6:
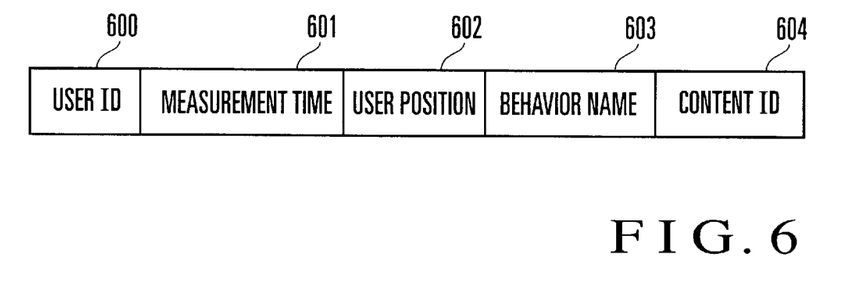
FIG. 6 is a view showing detection data detected by a user action detection section shown in FIG. 1.

The operations of the user action detection section 11 and preference information management section 12 will be described with reference to the flow chart shown in FIG. 5. First, the user action detection section 11 detects information related to a user's action and the content ID of a content related to the object of the action (step S50). More specifically, upon detecting a user's action on the basis of information from the portable information terminal 8 that a user is carrying, the user action detection section 11 detects a user ID 600, a measurement time 601 when execution of the action has been measured, a user position 602 where the action has been executed, a action name 603 representing that action, and a content ID 604 representing a content related to the object of the action, as shown in FIG. 6, and transfers the pieces of information to the preference information management section 12 (step S51).

The user's action and content ID may be detected from a action that the user has accessed the center 1 from the portable information terminal 8 and browsed a content or a action that the user has browsed a content for a long time and the content ID of the browsed content. Alternatively, that the user is staying at a certain spot may be recognized on the basis of the position information of the portable information terminal 8, and the action "stay" and the content ID of a content related to the stay position may be detected.

For the position information of the portable information terminal 8, the portable information terminal 8 may notify the center 1 of its position information that is detected by a known position detection technique using a radio communication network. A user ID can also be acquired at this time. Alternatively, the center 1 may collect the position information of the portable information terminal 8 using a position information service provided by a radio communication carrier. To obtain a content or content ID from position information, a map database or the like is used.

Figure 9:
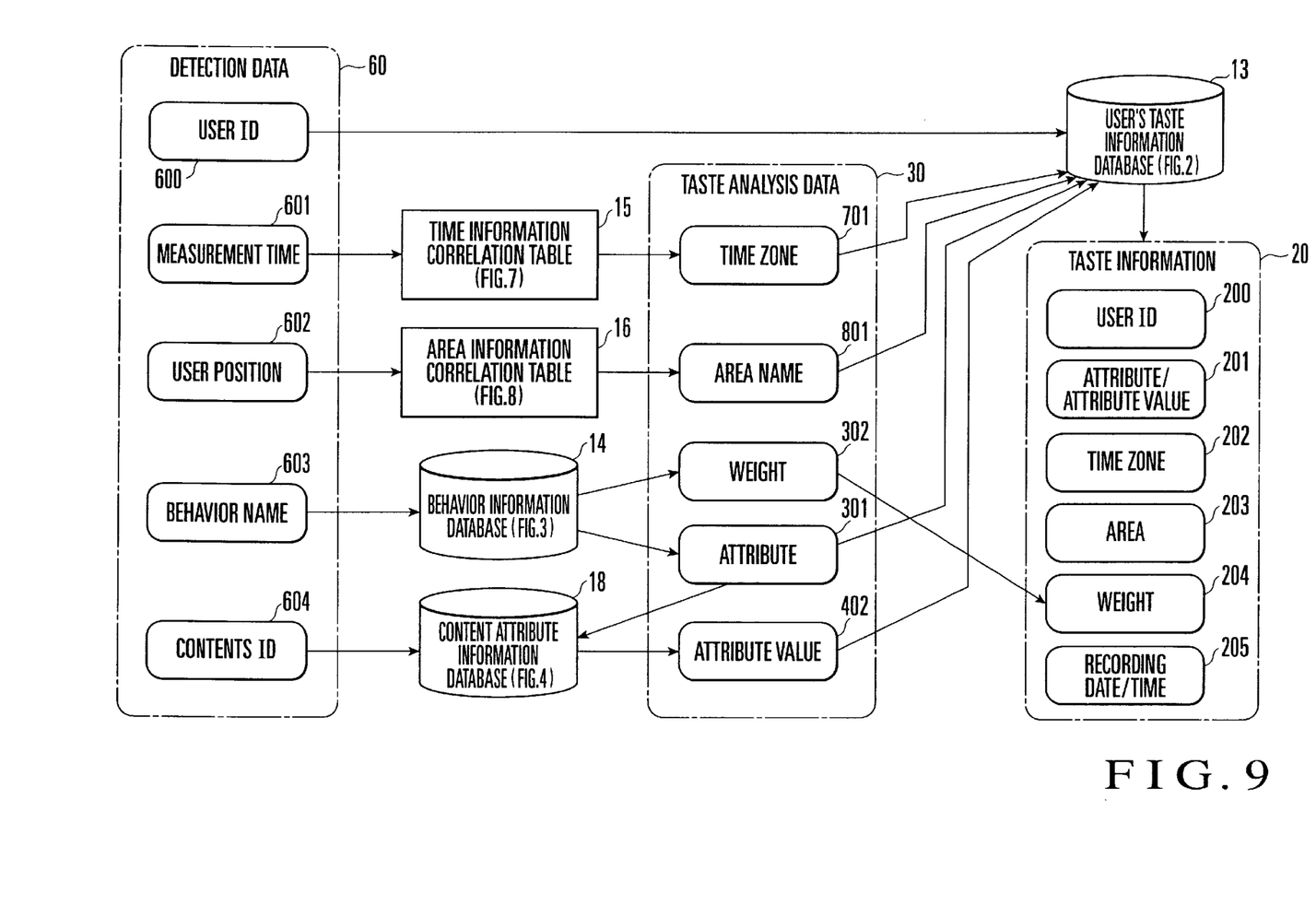
FIG. 9 is a view for explaining data processing by the preference information management section shown in FIG. 1.

As shown in FIG. 9, the preference information management section 12 analyzes detection data 60 received from the user action detection section 11 to generate preference analysis data 30, thereby updating the user's preference information database 13. This will be described in detail. First, the preference information management section 12 searches the action information database 14 on the basis of the action name 603 contained in the detection data 60 to obtain the attribute 301 and weight 302 of the action (step S52). For example, the action is "visit", and the attribute is "keyword".

Next, the preference information management section 12 searches the content attribute information database 18 on the basis of the content ID 604 contained in the detection data 60 and the attribute 301 of the action obtained in step S51, thereby obtaining the attribute value 402 (step S53). For example, when the content ID is "hamburger shop A", and the attribute is "keyword", the attribute value is "fast-food" or "hamburger".

Figure 7:
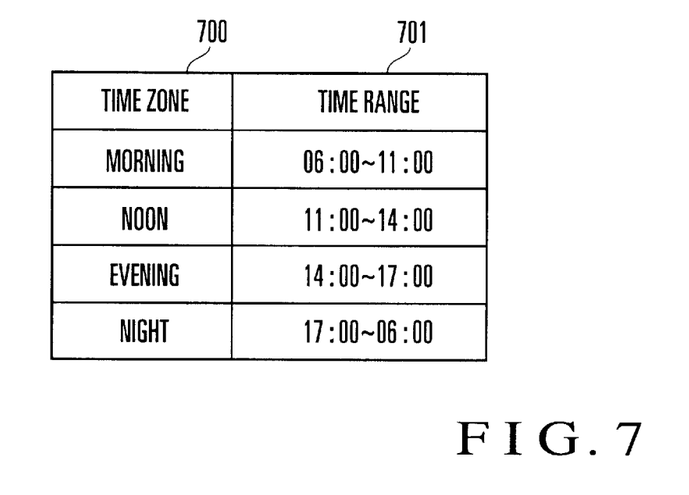
FIG. 7 is a view showing a time information correlation table shown in FIG. 1.

Then, the preference information management section 12 looks up the time information correlation table 15 on the basis of the measurement time 601 contained in the detection data 60 to obtain the time zone when that action has been executed (step S54). FIG. 7 shows the time information correlation table. Referring to FIG. 7, time zones 700 "morning", "noon", "evening", and "night" are assigned to time ranges 701.

Figure 8:
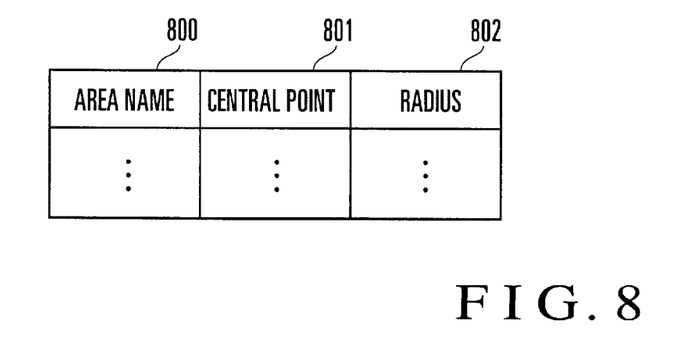
FIG. 8 is a view showing an area information correlation table shown in FIG. 1.

The preference information management section 12 also looks up the area information correlation table 16 on the basis of the user position 602 contained in the detection data 60 and checks and acquires an area name 800 where the action has been executed (step S55). FIG. 8 shows the area information correlation table.

As an area check method, a central point 801 defined by a latitude and longitude and its radius (X km) 802 are designed on the area information correlation table 16, and a circle with the radius 802 from the central point 801 is set in correspondence with an area name 800. The preference information management section 12 checks which area includes the action by looking up the area information correlation table 16 on the basis of the user position 602. If the area information correlation table 16 contains no area including the user position 602, a new circle having a radius X km from the user position 602 is registered as a new area. In this case, the value of the radius (X km) is given as a default value.

A region name described by an address may be described in the area information correlation table 16 as an area, and it may be checked on the basis of the user position 602 which area includes the action.

In this way, the preference information management section 12 analyzes a preference contained in the user's action on the basis of the detection data 60 received from the user action detection section 11. As data representing the analysis result, preference analysis data containing the attribute 301, attribute value 402, weight 302, time zone 700, and area name 800, which represents the user's preference, is generated. Next, the preference information management section 12 searches the user's preference information database 13 on the basis of the user ID 600 contained in the detection data 60 and extracts user's preference information 20.

The preference information management section 12 updates the user's preference information database 13 on the basis of the preference analysis data 30 generated from the detection data 60 received from the user action detection section 11 (step S57). If pieces of preference information extracted from the user's preference information database 13 include user's preference information that matches the preference analysis data 30, for example, if preference information 20 for which all the attribute/attribute value 201, time zone 202, and area 203 match those in the preference analysis data 30 is present, the weight 204 of the user's preference information 20 is incremented/decremented by the weight 302 of the preference analysis data 30. When the action has a negative meaning, the weight has a negative value, and actually, the weight 204 of the attribute is decreased.

For example, assume that the content ID 604 related to the object of the action is "hamburger shop A", the action name 603 in the preference analysis data 30 is "visit", the attribute 301 is "keyword", the attribute value 402 is "fast-food", and the weight 302 is "+1". In this case, preference information whose attribute/attribute value 201 is "keyword: fast-food" is searched from pieces of preference information of the user, which are extracted from the user's preference information database 13. When the time zone 202 and area 203 of the searched preference information match those of the preference analysis data 30, the weight 204 is incremented by "+1", and the update time is stored in the recording date/time 205.

Assume that preference information whose attribute/attribute value 201 is "keyword: fast-food" is not found, or even if it is, the time zones or areas do not match. In this case, as new preference information belonging to the user ID 200, the attribute 301 and attribute value 402 of the preference analysis data 30 are stored in the attribute/attribute value 201, the time zone 700 is stored in the time zone 202, the area name 800 is stored in the area 203, "+1" is stored in the weight 204, and the update time is stored in the recording date/time 205, thereby creating new preference information.

In the above-described way, the preference information management section 12 updates or creates the corresponding preference information 20 on the basis of the preference analysis data 30 and stores the preference information in the user's preference information database 13 (step S58). After the pieces of information are stored, the series of preference information management processes are ended.

As described above, since the time zone of a user's action and position information at that time are detected on the basis of information from the portable information terminal 8, the user's preference can be learned in accordance with the time zone and position information (place). Hence, even under circumstances unique to the mobile environment where the preference changes in accordance with the user's situation, a content that is optimum for the time zone and place where the user is present can be provided in response to a browsing request from the user.

Figure 10:
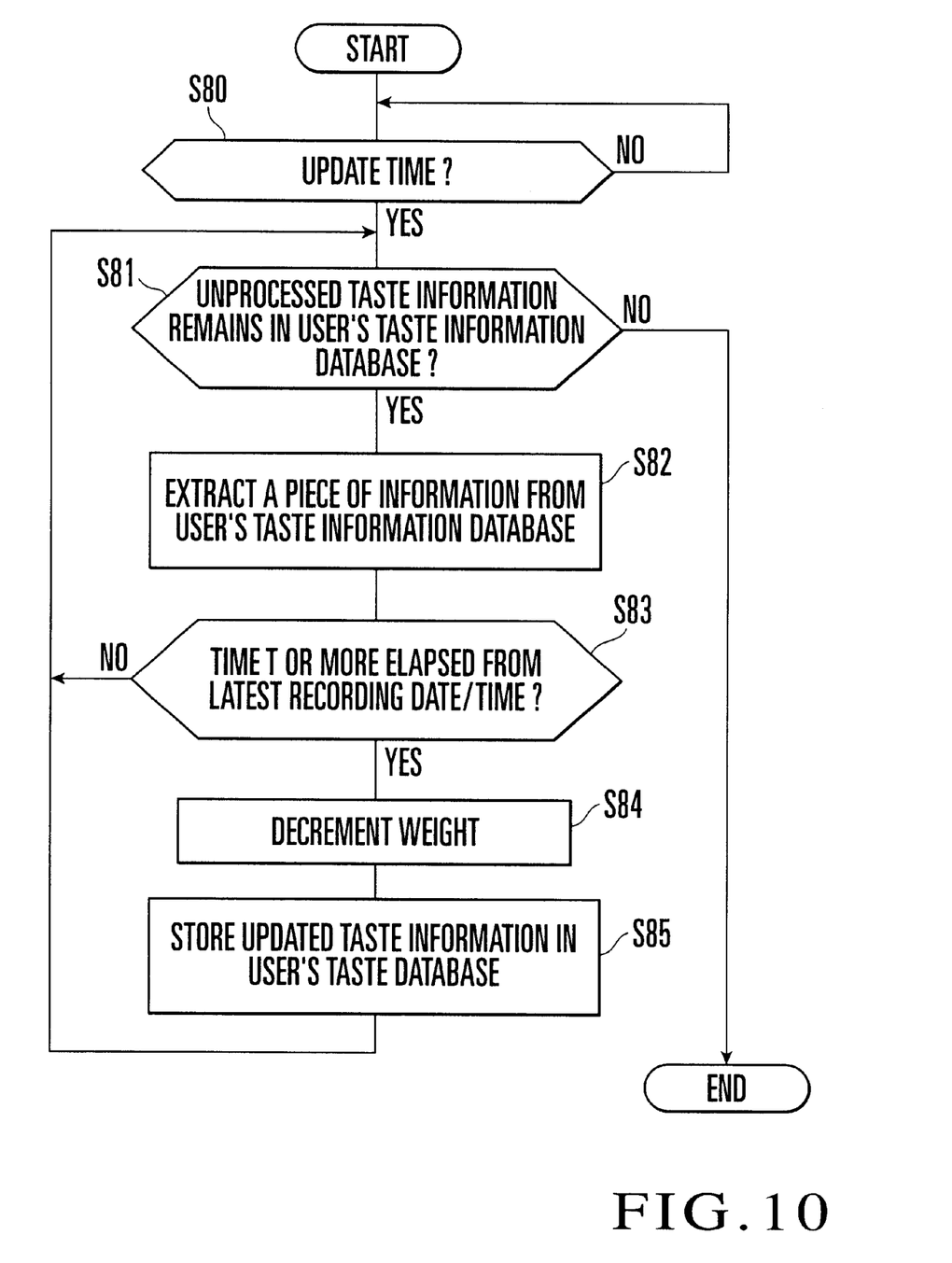
FIG. 10 is a flow chart showing processing by a preference information update section shown in FIG. 1.

The operation of the preference information update section 17 will be described next with reference to the flow chart shown in FIG. 10.

The preference information update section 17 monitors the update time (step S80) and starts preference information update processing (to be described below) at the update time. For example, the preference information update section 17 stores the update time, and at that time, automatically starts the preference information update processing. As the preference information update processing, the preference information update section 17 accesses the user's preference information database 13 first to extract each unprocessed preference information (steps S81 and S82).

Using the current time and the recording date/time 205 of each extracted preference information, it is checked whether a predetermined time T or more has elapsed from the latest preference information update time (step S83). For example, the preference information update section 17 compares the time T representing a timing when a preset weight is to be updated with the difference between the recording date/time 205 and the current time. If the predetermined time T or more has not elapsed yet (NO in step S83), the flow returns to step S81 to select the next preference information and execute similar processing.

If the predetermined time T or more has elapsed (YES in step S83), the weight 204 of preference information is decremented, and the update date/time is stored in the recording date/time 205 (step S84). The ratio of decrement of the weight 204 and the minimum value (minimum point) of the weight 204 are preset in the preference information update section 17. If the weight 204 reaches the minimum value upon decrement, the preference information may be deleted from the user's preference information database 13.

Subsequently, the preference information update section 17 stores the updated preference information in the user's preference information database 13 (step S85). The flow returns to step S81 to select the next preference information and execute similar processing. In this way, the preference information update section 17 checks and updates each preference information in the user's preference information database 13. When no unprocessed preference information remains (NO in step S81), the series of preference information update processes are ended.

With this processing, the weight related to each preference information in the past is gradually decremented while placing emphasis on latest preference information. Hence, a change-over-time in user's preference can be properly learned and managed.

A case wherein the content selection section 5 in the center 1 which distributes various contents selects a content suitable for the user using the user's preference information database 13 obtained by the preference learning operation by the preference learning apparatus 4 will be described next.

Figure 11:
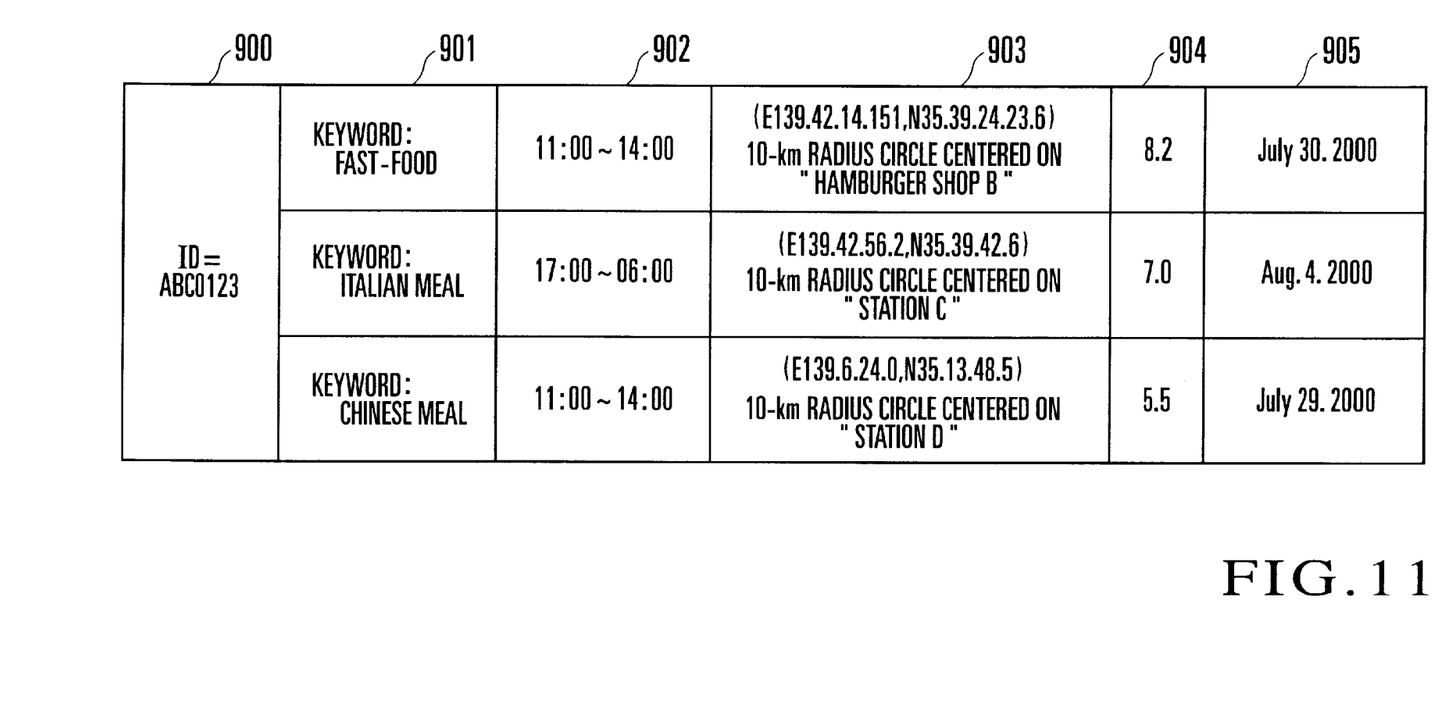
FIG. 11 is a view showing a detailed example of the user's preference information database shown in FIG. 1.

Assume that for a user (ID="ABC0123"), three pieces of preference information 911 to 913 are recorded in the user's preference information database 13, as shown in FIG. 11. For example, in the preference information 911, the attribute/attribute value 901 is "keyword: fast-food", a time zone 902 is "11:00 to 14:00", and area 903 is "10-km-radius circle centered on the hamburger shop B (East longitude: 139.42.14.151, North latitude: 35.39.24.236)", a weight 904 is "8.2", and a recording date/time 905 is "Jul. 30, 2000".

This preference information 911 is obtained on the basis of a log in which the user (ID="ABC0123") have executed action "visit" for object "hamburger shop B" in noon time zone a plurality of number of times. The recording date/time 905 indicates the latest date/time of visit to "hamburger shop B".

Assume a service for push-distributing a content considering the user's situation (time, place, and preference) to the user's portable information terminal. When the user who is out sends a content distribution request from the portable information terminal 8 to the center 1, the portable information terminal 8 notifies the center 1 of the user ID and position information representing the current position together. The content selection section 5 in the center 1 selects a content in response to this request. At this time, the score of each content is calculated using the weight of the user's preference information database 13, and a content having a high store is distributed to the user.

Assume that the user (ID="ABC0123") is in the B area at about 12:00. Since the current time (12:00) falls within the time range of the time zone 902, and the position of the user (ID="ABC0123") falls within the area range of the area 903, the preference information 911 is used to calculate scores. The weight "8.2" is added to the score of each content having "fast-food" as the keyword. For this reason, the total score of each content having "fast-food" as the keyword becomes high. As a consequence, the scores of fast-food shops become high, and these shops are selected as contents to be distributed to the user.

Assume that the user (ID="ABC0123") is near the station C at 18:00. In this case, the scores of contents of Italian restaurants become high. The neighborhood of the station C also belongs to the area 903 of the preference information 911. However, since 18:00 falls outside the range of the time zone 902 of the preference information 911, the preference information 911 is not used. In this case, the preference information 912 with "keyword: Italian meal" whose time zone 902 and area 903 match the current situation is used to calculate scores. For this reason, contents having "Italian meal" as the keyword are readily selected.

Assume that the user (ID="ABC0123") is near the station D in the noon time zone. In this case as well, due to the same reason as described above, the preference information 913 is used to calculate scores, and the contents of Chinese restaurants are readily selected near the station D.

Figure 12:
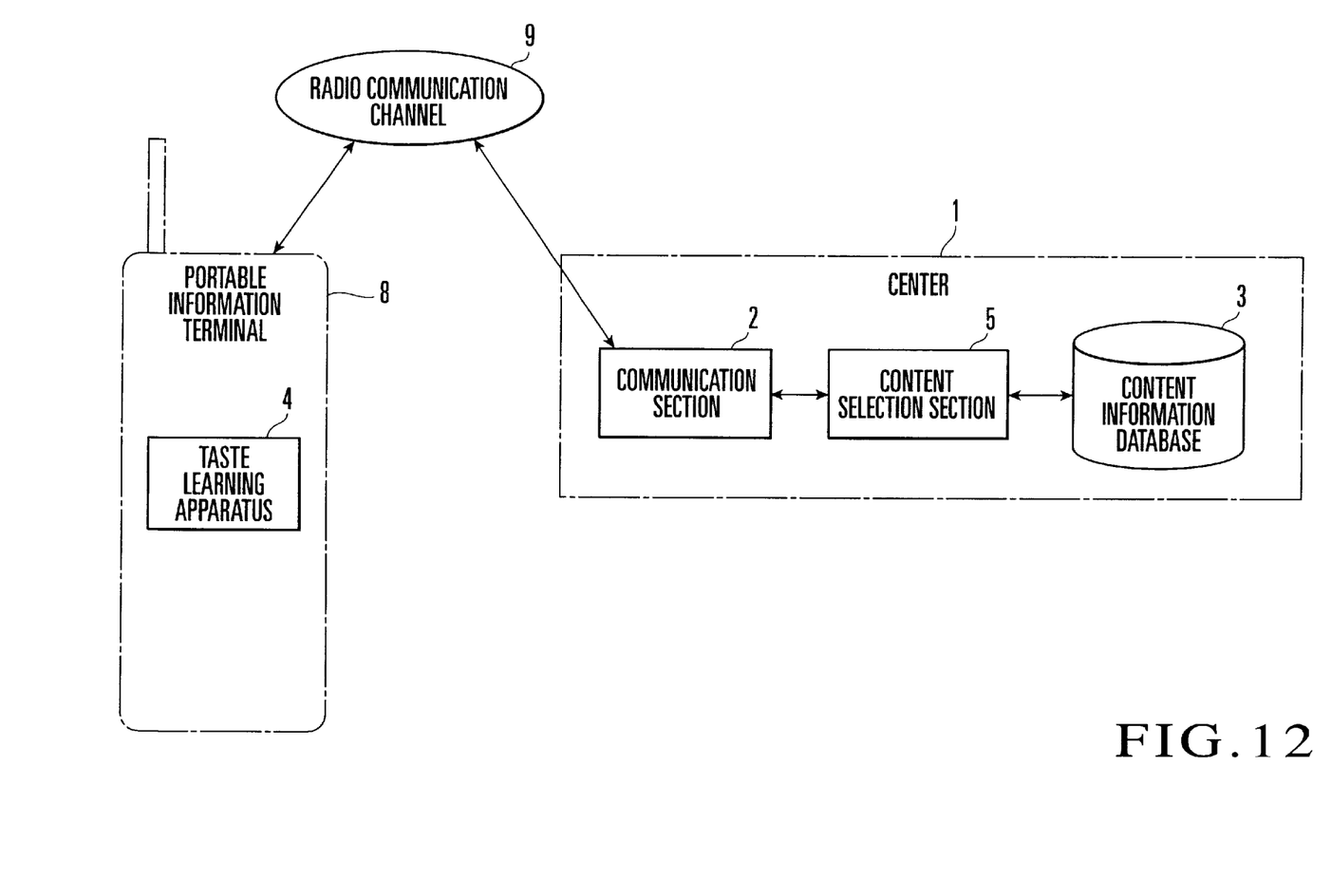
FIG. 12 is a block diagram of a preference learning system according to another embodiment of the present invention.

A preference learning system in which the preference learning apparatus 4 is arranged in the center 1 has been described above. However, a preference learning apparatus 4 may be provided in a portable information terminal 8, as shown in FIG. 12. In this case, the portable information terminal 8 notifies a center 1 of preference information learned by the internal preference learning apparatus 4 as needed. The center 1 executes information filtering on the basis of the preference information from the portable information terminal 8 and provides to the user a content corresponding to the time zone and position information.

Figure 13:
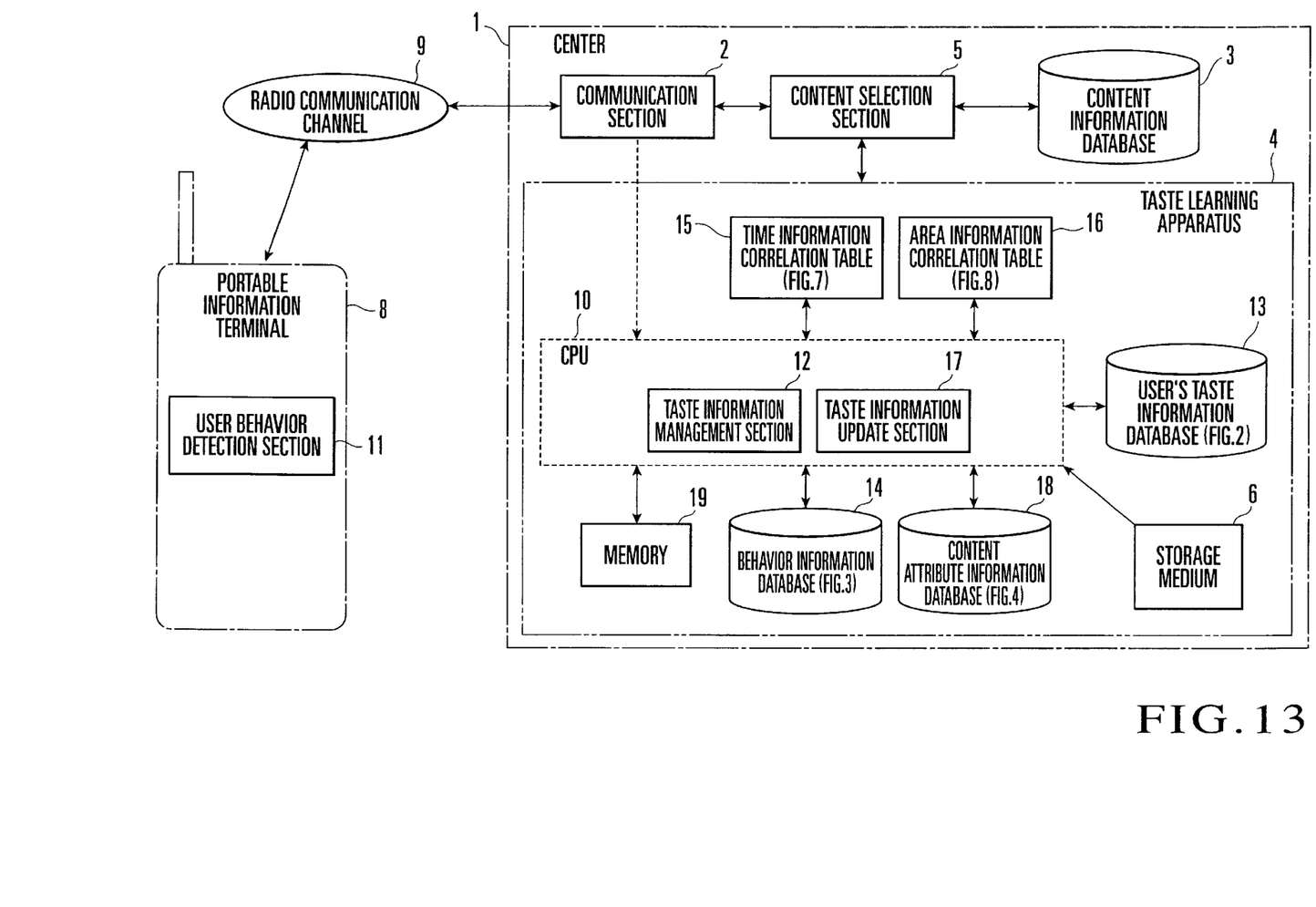
FIG. 13 is a block diagram of a preference learning system according to still another embodiment of the present invention.

As another preference learning system, only a user action detection section 11 in a preference learning apparatus 4 may be provided in a portable information terminal 8, as shown in FIG. 13. In this case, a center 1 is notified of detection data detected by the user action detection section 11 in the portable information terminal 8. In the center 1, a preference information management section 12 creates preference analysis data 30 on the basis of the detection data from the portable information terminal 8 using a content attribute information database 18, action information database 14, time information correlation table 15, and area information correlation table 16, and preference information 20 in a user's preference information database 13 is updated.

As has been described above, according to the present invention, a user's preference can be learned in accordance with a time zone and position information (place). Even under circumstances unique to the mobile environment where the preference changes in accordance with the user's situation, a content that is optimum for the time zone and place where the user is present can be provided in response to a browsing request from the user.

In addition, since the weight related to each preference information in the past is gradually decremented while placing emphasis on latest preference information, a change-over-time in user's preference can be properly learned and managed.

What is claimed is:

1. A preference learning apparatus for detecting an individual user's action from each of a plurality of different positions of a portable information terminal to which various kinds of contents are provided through a communication channel and learning the individual user's preference on the basis of a detected action log, comprising:

a content attribute information database for storing, for each content, an attribute/attribute value as objects of the learning contained in each of various kinds of contents;

an action information database for storing, for each action, an attribute as an object of the learning estimated from the individual user's action and a weight for the attribute;

a time information correlation table for storing a name and time range of a time zone in correspondence with each other;

an area information correlation table for storing each area name and area range in correspondence with each other for each of a plurality of areas which classify position information of the individual user;

an individual user's preference information database for storing, for each individual user's preference information containing an attribute/attribute value as objects of the learning, a weight for the attribute, a time zone when the weight is valid, and a place where the weight is valid;

user action detection means for detecting the individual user's action on the basis of information obtained from the portable information terminal and acquiring detection data containing a user ID indicating the individual user, a action name indicating the action, a content ID indicating a content related to an object of the action, measurement time information at which each of a plurality of different actions has been detected and measurement position information corresponding to each of said plurality of different positions of said portable information terminal at which said plurality of different actions have been detected; and preference information management means for updating said user's preference information database on the basis of preference analysis data obtained by analyzing the user's preference on the basis of the detection data output from said user action detection means, wherein said preference information management means generates the preference analysis data using time zone information acquired from said time information correlation table on the basis of the measurement time contained in the detection data output from said user action detection means, the area name acquired from said area information correlation table on the basis of the position information contained in the detection data, the attribute and weight contained in the action which are acquired from said action information database on the basis of the action name contained in the detection data, and the attribute value acquired from said content attribute information database on the basis of the attribute as an object of the learning and the content ID contained in the detection data, and updates, with a weight contained in the generated preference analysis data, the weight contained in the preference information in the user's preference information database, which is specified by the time zone information, area name, and attribute/attribute value as objects of the learning, which are contained in the generated preference analysis data, and the user ID contained in the detection data.

2. An apparatus according to claim 1, further comprising preference information update means for decrementing a value of the weight of the preference information stored in said individual user's preference information database when a predetermined time has elapsed from a latest update date/time to re update the value of the weight.

3. An apparatus according to claim 1, wherein the attribute/attribute value as objects of the learning are an attribute/attribute value related to the individual user's-preference.

4. A preference learning system having a center for managing various kinds of contents to be provided to an individual user of a portable information terminal which accesses said center through a radio communication channel in accordance with the individual user's operation to acquire and display a desired content, and a preference learning apparatus for learning the individual user's preference on the basis of information obtained from said portable information terminal in accordance with a time zone and each of a plurality of different positions at which the individual user's action takes place, wherein said preference learning apparatus comprises:

a content attribute information database for storing, for each content, an attribute/attribute value as objects of the learning contained in each of various kinds of contents;

an action information database for storing, for each action, an attribute as an object of the learning estimated from the individual user's action and a weight for the attribute;

a time information correlation table for storing a name and time range of a time zone in correspondence with each other;

an area information correlation table for storing each area name and area range in correspondence with each other for each of a plurality of areas which classify position information of the individual user;

an individual user's preference information database for storing, for each user's preference information containing an attribute/attribute value as objects of the learning, a weight for the attribute, a time zone when the weight is valid, and a place where the weight is valid;

user action detection means for detecting the individual user's action on the basis of information obtained from said portable information terminal and acquiring detection data containing a user ID indicating the individual user, a action name indicating the action, a content ID indicating a content related to an object of the action, measurement time information at which each of a plurality of different actions has been detected and measurement position information corresponding to each of said plurality of different positions of said portable information terminal at which said plurality of different actions have been detected; and preference information management means for generating preference analysis data by analyzing the user's preference on the basis of the detection data output from said user action detection means and updating said user's preference information database on the basis of the generated preference analysis data, and said preference information management means generates the preference analysis data using time zone information acquired from said time information correlation table on the basis of the measurement time contained in the detection data output from said user action detection means, the area name acquired from said area information correlation table on the basis of the position information contained in the detection data, the attribute and weight contained in the action acquired from said action information database on the basis of the action name contained in the detection data, and the attribute value acquired from said content attribute information database on the basis of the attribute as an object of the learning and the content ID contained in the detection data, and updates, with the weight contained in the generated preference analysis data, a weight contained in the preference information of the user's preference information database, which is speci-
fied by the time zone information, area name, and attribute/attribute value as objects of the learning, which are contained in the generated preference analysis data, and the user ID contained in the detection data.

5. A system according to claim 4, wherein said preference learning apparatus is arranged in said center.

6. A system according to claim 4, wherein said preference learning apparatus is arranged in said portable information terminal.

7. A system according to claim 4, wherein said user action detection means of said preference learning apparatus is arranged in said portable information terminal, said content attribute information database, action information database, time information correlation table, area information correlation table, user's preference information database, and preference information management means of said preference learning apparatus are arranged in said center, and said preference information management means receives the detection data transmitted from said user action detection means.

8. A system according to claim 4, wherein the attribute/attribute value as objects of the learning are an attribute/attribute value related to the use's preference.

9. A preference learning method of detecting an individual user's action from each of plaintiffs of different positions of portable information terminal to which various kinds of contents are provided through a communication channel and learning an individual user's preference on the basis of a detected action log in a system comprising a content attribute information database for storing, for each content, an attribute/attribute value as objects of the learning contained in each of various kinds of contents, an action information database for storing, for each action, an attribute as an object of the learning estimated from the individual user's action and a weight for the attribute, a time information correlation table for storing a name and time range of a time zone in correspondence with each other, an area information correlation table for storing each area name and area range in correspondence with each other for each of a plurality of areas which classify position information of the individual user, and an individual user's preference information database for storing, for each individual user, user's preference information containing an attribute/attribute value as an object of the learning, a weight for the attribute, a time zone when the weight is valid, and a place where the weight is valid, comprising the steps of:

detecting the individual user's action on the basis of information obtained from the portable information terminal and acquiring detection data containing a user ID indicating the user, a action name indicating the action, a content ID indicating a content related to an object of the action, measurement time information at which each of a plurality of different actions has been detected and measurement position information corresponding to each of said plurality of different positions of said portable information terminal at which said plurality of different actions have been detected;

generating preference analysis data using time zone information acquired from the time information correlation table on the basis of the measurement time contained in the obtained detection data, the area name acquired from the area information correlation table on the basis of the position information contained in the detection data, the attribute and weight contained in the action which are acquired from the action information database on the basis of the action name contained in the detection data, and the attribute value acquired from the content attribute information database on the basis of the attribute as an object of the learning and the content ID contained in the detection data; and specifying the preference information in the user's preference information database using the time zone information, area name, and attribute/attribute value as objects of the learning, which are contained in the generated preference analysis data, and the user ID contained in the detection data, and updating the weight contained in the specified preference information with the weight contained in the preference analysis data.

10. A method according to claim 9, further comprising the step of decrementing a value of the weight of the preference information stored in the user's preference information database when a predetermined time has elapsed from a latest update date/time to re update the value of the weight.

11. A recording medium which stores a program for detecting an individual user's action from each of a plurality of different positions of a portable information terminal to which various kinds of contents are provided through a communication channel and learning the individual user's preference on the basis of a detected action log in a system comprising a content attribute information database for storing, for each content, an attribute/attribute value as objects of the learning contained in each of various kinds of contents, an action information database for storing, for each action, an attribute as an object of the learning estimated from the individual user's action and a weight for the attribute, a time information correlation table for storing a name and time range of a time zone in correspondence with each other, an area information correlation table for storing each area name and area range in correspondence with each other for each of a plurality of areas which classify position information of the individual user, and an individual user's preference information database for storing, for each individual user, user's preference information containing an attribute/attribute value as objects of the learning, a weight for the attribute, a time zone when the weight is valid, and a place where the weight is valid, comprising the steps of:

detecting the individual user's action on the basis of information obtained from the portable information terminal and acquiring detection data containing a user ID indicating the individual user, a action name indicating the action, a content ID indicating a content related to an object of the action, measurement time information at which each of a plurality of different actions has been detected and measurement position information corresponding to each of said plurality of different positions of said portable information at which said plurality of different actions have been detected;

generating preference analysis data using time zone information acquired from the time information correlation table on the basis of the measurement time contained in the obtained detection data, the area name acquired from the area information correlation table on the basis of the position information contained in the detection data, the attribute and weight contained in the action which are acquired from the action information database on the basis of the action name contained in the detection data, and the attribute value acquired from the content attribute information database on the basis of the attribute as an object of the learning and the content ID contained in the detection data; and specifying the preference information in the user's preference information database using the time zone information, area name, and attribute/attribute value as objects of the learning, which are contained in the obtained preference analysis data, and the user ID contained in the detection data, and updating the weight contained in the specified preference information with the weight contained in the preference analysis data.

12. A medium according to claim 11, wherein said program further comprises the step of decrementing a value of the weight of the preference information stored in the user's preference information database when a predetermined time has elapsed from a latest update date/time to re update the value of the weight.

* * * * *